United States Patent
Chen et al.

[19]

[11] Patent Number: 6,111,871
[45] Date of Patent: Aug. 29, 2000

[54] NETWORK DESIGN FOR BOTH COMPRESSED AND UNCOMPRESSED ATM CELLS

[75] Inventors: Howard Zehua Chen, Berkeley Heights; Hai J. Tan, Phiilipsburg, both of N.J.

[73] Assignee: Lucent Technologies Inc., Murray Hill, N.J.

[21] Appl. No.: 08/693,424

[22] Filed: Aug. 7, 1996

[51] Int. Cl.[7] .................. H04J 3/24; H04J 3/22; H04L 12/28

[52] U.S. Cl. .................. 370/349; 370/397; 370/471

[58] Field of Search .................. 370/349, 392, 370/389, 477; 395/200.77; 375/240; 348/384, 390

[56] References Cited

U.S. PATENT DOCUMENTS 5,535,199  7/1996  Amri et al. .................. 370/392
5,717,689  2/1998  Ayanoglu .................. 370/349

*Primary Examiner*—William Luther
*Attorney, Agent, or Firm*—Gibbons, Del Deo, Dolan, Griffinger & Vecchione

[57] ABSTRACT

A method and apparatus for reducing bandwidth in an ATM network. The invention provides an ATM switch having a compression module for compressing ATM cell headers without affecting the virtual circuit established for the call. The compressed headers provide the ATM switch buffers with extra space to handle more cells for a given call. To realize the benefit of the extra space during transmission, the present invention provides a mapping interface between the PHY and ATM layers of the ATM communication. The mapping interface separates the compressed headers from the uncompressed headers into two different PHY payloads. The cells transmitted in the compressed payload are then expanded in an expansion module located in the call destination switch. The expansion module returns the compressed headers back to their original form.

8 Claims, 6 Drawing Sheets

NETWORK DESIGN FOR BOTH COMPRESSED AND UNCOMPRESSED ATM CELLS

FIELD OF THE INVENTION

This invention relates to communication systems, and more particularly to transmission techniques for networked information.

BACKGROUND OF THE INVENTION

The basic service of an asynchronous transfer mode (ATM) network is the transport and routing (i.e. multiplexing, transmission and switching) of ATM cells. In current ATM technology, an ATM cell is 53 bytes long, including a 5 byte header that contains all the information necessary for network management. To process a call consisting of a plurality of cells, ATM switches examine the header of each cell and perform all the necessary switching functions according to that header. Thus, the network treats all the ATM cells in exactly the same manner. That is, during the same end-to-end call, all the ATM cells travel through the same virtual circuit, which remains unchanged, for the duration of the call.

As a result, in sending the full header with every ATM cell of a particular call, present day ATM services can waste much transmission bandwidth. More specifically, since the header of the first cell (in the string of cells for a particular call) sets-up the virtual circuit through which all the cells travel, the cells following the first cell waste bandwidth by carrying that same header information through the virtual circuit. That is, in a circuit-switching ATM network, the ATM cells that travel after the first sell contain redundant header information. Thus, by sending the header with each cell of a particular call, much system bandwidth is wasted. The present invention addresses this need.

SUMMARY OF THE INVENTION

Accordingly, the present invention is directed to a method and apparatus for substantially reducing bandwidth waste for ATM transmissions over a physical link and for reducing the traffic load over the entire ATM network. To attain this, the present invention provides a method and apparatus for compressing ATM cell headers, and a new physical layer (PHY) mapping function for controlling the switching of both compressed and uncompressed conventional ATM cells. As a result, an ATM network incorporating the apparatus and method of the present invention provides support for both uncompressed (conventional) ATM cell traffic and compressed ATM cell traffic.

In one embodiment of the present invention, a compression module and a decompression module are added to each ATM switch. The compression module identifies each ATM cell traveling through its respective switch as either a "parent cell" or a "baby cell," wherein the first and last cells of a particular call are designated as parent cells, and wherein the cells transmitted between the parent cells for a given call are designated as baby cells. Once a cell is identified as a baby cell, the compression module compresses its header into a minimum amount of control information. The parent cell headers are left intact.

Basically, the compressed header of a baby cell contains information that indicates which parent header the baby cells should follow. The compressed headers take up less cell bytes than the headers of the parent cells, thus leaving empty header bytes in the ATM baby cells. To actually realize bandwidth savings, however, the empty header bytes in the baby cells must not be mapped into the PHY layer payload. To prevent such mapping, a new physical layer framer is added to the ATM switch.

In one embodiment, the new framer provides two pointers: One pointer to indicate the position of the start of the first ATM cell or parent cell in the PHY payload; and the other pointer to indicate the start of the data block containing compressed baby cells. As a result, in addition to transmission bandwidth savings, ATM switches according to the present invention provide the ATM system with the ability to utilize empty header bytes to hold more cells in the ATM switch buffers, thus resulting in increased ATM switch capacity. Thus, the present invention overcomes, to a large extent, the limitations associated with the prior art.

These and other features of the invention are described in more complete detail in the following detailed description of embodiments of the invention when taken with the drawings. The scope of the invention, however, is limited only by the claims appended hereto.

DETAILED DESCRIPTION OF EMBODIMENTS OF THE INVENTION

Figure 1:
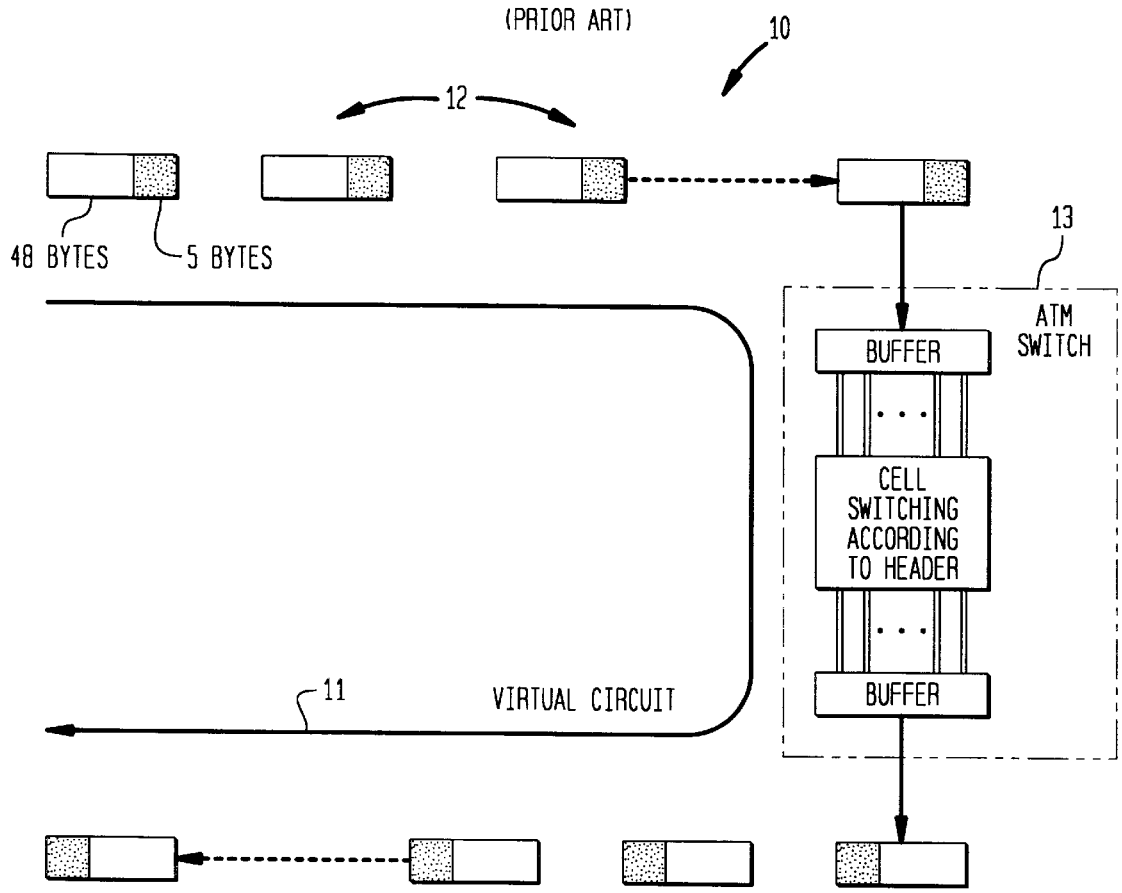
FIG. 1 is a block diagram of a conventional prior art ATM Network for transporting standard 53 byte ATM cells.

Referring now to FIG. 1 there is shown the movement of ATM cells in an ATM network 10 (prior art) during a conventional end-to-end ATM call. As shown, a stream 12 of ATM cells travel through a virtual circuit 11 established in the ATM network 10. Each cell is 53 bytes long, including a 48 bytes for data and a 5 byte header. The headers of each cell in a particular call contain essentially the same information, including the switching information for that cell. This insures that each cell of a particular call reaches the same destination.

In operation, ATM switch 13 reads the header contents of the first cell of a particular call and sets up a virtual circuit (using a routing table) establishing a communication path from the call originator to the call destination. The second cell through the last cell for that call follow the first cell through virtual circuit 11 to the destination. As a result, since the header of the cells following the first cell contain the same header information as the first cell (i.e. to set up the virtual circuit), that header information is redundant and adds no extra services for that call. That is, it is only the first cell that needs to contain the switching information, the other cells simply need to contain the minimum header information to be able to follow the first cell through the virtual circuit. As a result, ATM networks that switch cells for a given call, wherein each cell in the call contains a full header, are not efficient for connection-oriented or circuit-switched calls.

Figure 2:
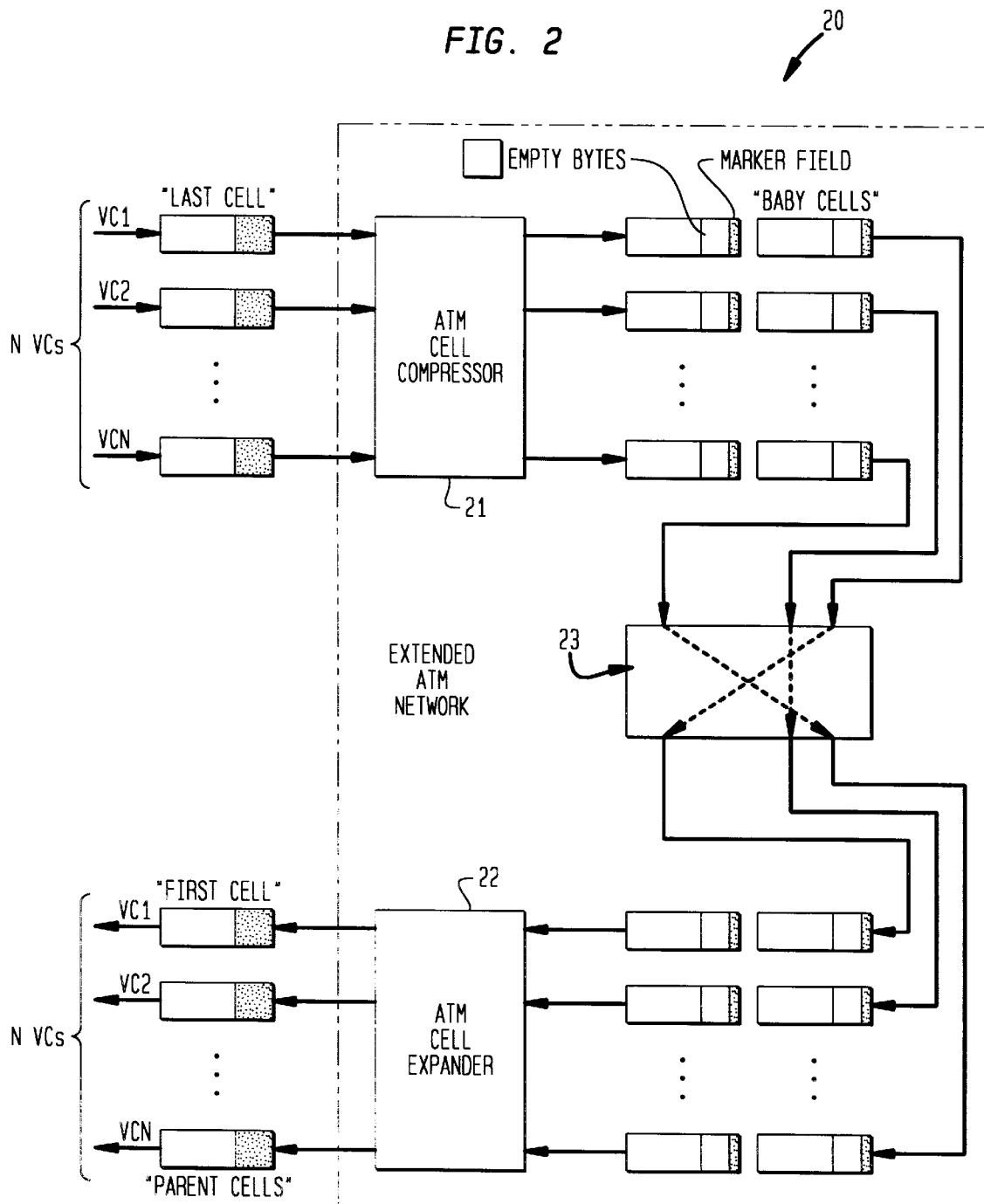
FIG. 2 is a block diagram of one embodiment of an ATM network providing bandwidth reductions according to the present invention.

To provide an ATM network that is efficient for such connection-oriented calls, the present invention provides a method and apparatus for compressing predetermined cell headers, and for mapping compressed cells that belong to the same call in a block of the payload for ATM switching. Referring now to FIG. 2, there is shown one embodiment of an ATM network 20 providing cell compression and expansion according to the present invention. As shown, ATM network 20 has a cell compressor 21 coupled to an enhanced ATM network 23 which, in turn, is coupled to a cell expander 22.

In operation, ATM cells for calls traveling over N different virtual circuits (VCs) flow through ATM network 20 such that transmission bandwidth waste is substantially reduced. More specifically, cell compressor 21 identifies each cell of a particular call as either a "parent cell" or a "baby cell." The first and last cells of each call are designated as parent cells, and the cells transmitted between the parent cells are designated as baby cells. Compressor 21 compresses the header of each baby cell so that each baby cell contains the minimum information necessary to insure that enhanced ATM network 23 directs the baby cells through the same virtual circuit (VC) as its respective parent cells. Once the cells reach the call terminating ATM switch (not shown) of enhanced ATM network 23, cell expander 22 expands the baby cell headers to their original size and transmits the cells over its respective VCs.

In compressing the headers of the baby cells, cell compressor 21 outputs both compressed and uncompressed ATM cells to the enhanced ATM network 23. Moreover, in compressing the baby cells, compressor 21 creates ATM cells having empty header bytes. As a result, to provide proper switching of the ATM cells for each call, enhanced ATM network 23 must have ATM switches that can identify whether a cell is a baby cell (i.e. compressed) or a parent cell (i.e. uncompressed) for proper switching to the appropriate virtual circuit. In addition, to realize actual bandwidth savings in ATM network 20, enhanced ATM network 23 must not map the empty header bytes into the PHY layer payload. Rather, network 23 must provide a means for framing an transporting the compressed baby cells without the empty header bytes.

Figure 3:
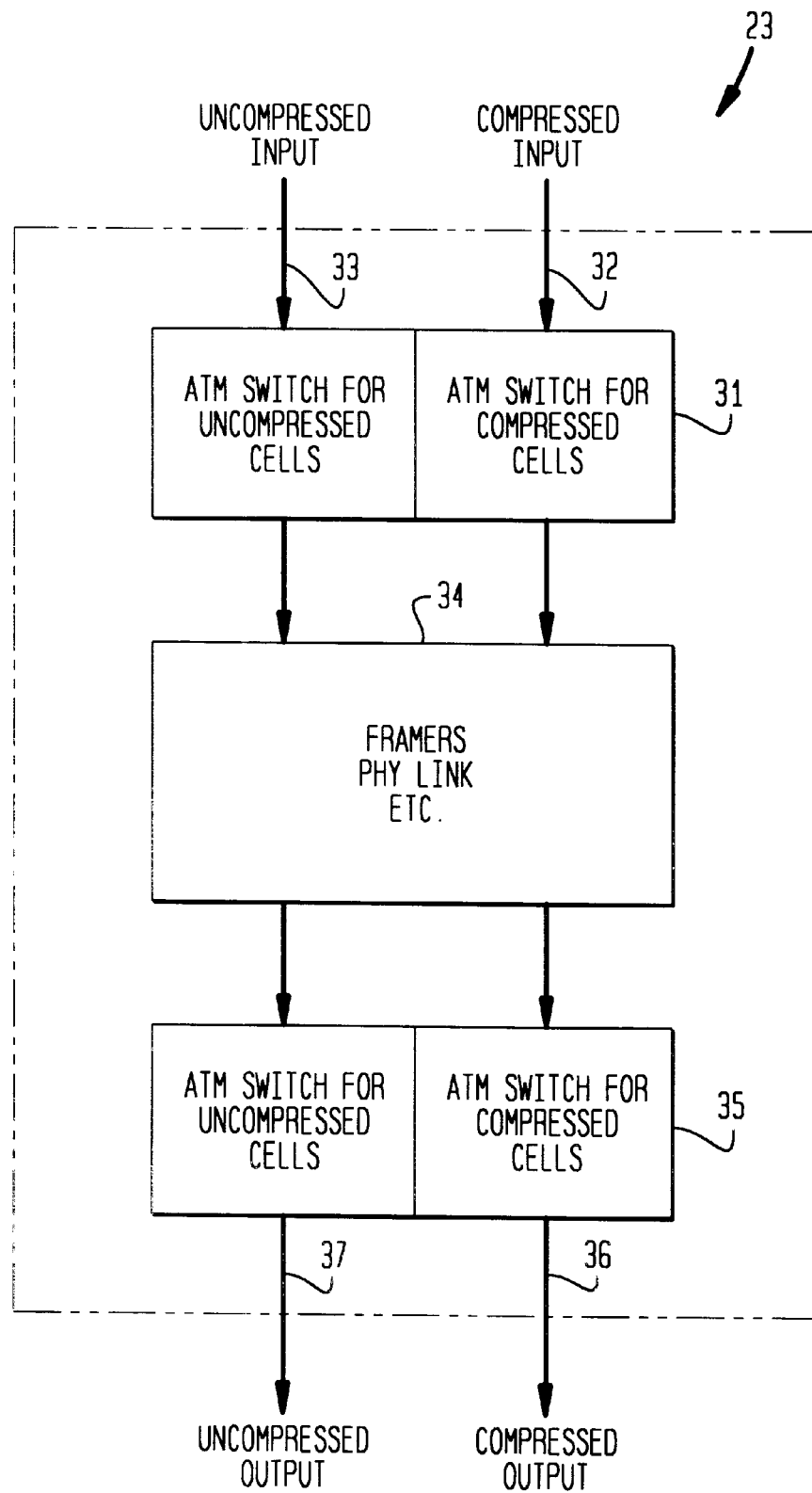
FIG. 3 is a block diagram of the enhanced ATM network shown in FIG. 2.

One embodiment of enhanced ATM network 23 is shown in FIG. 3. As shown, enhanced ATM network 23 has an initiating ATM switch 31 having an input 32 and 33 for both compressed and uncompressed cells. ATM switch 31 is coupled to a new framer/physical transport means 34 which, in turn, is coupled to a terminating ATM switch 35. The new framer/physical transport means is referred to as the framer/physical link 34 in FIGS. 3 and 4. Terminating ATM switch 35 has an output 36 and 37 for both compressed and uncompressed cells.

In operation, both the compressed an uncompressed ATM cells are input to initiating ATM switch 31 which identifies each cell as a baby cell (i.e. compressed) or a parent cell (i.e. uncompressed). Once identified, the cells are sent to framer/physical transport means 34, wherein the empty headers of the baby cells are removed from the payload actually transmitted over the physical link (e.g. SONET). The header reduced payload is then received by terminating ATM switch 35, wherein the baby cells are expanded back into their original form an sent over the appropriate virtual circuit at the receiving end of the ATM call.

Figure 4:
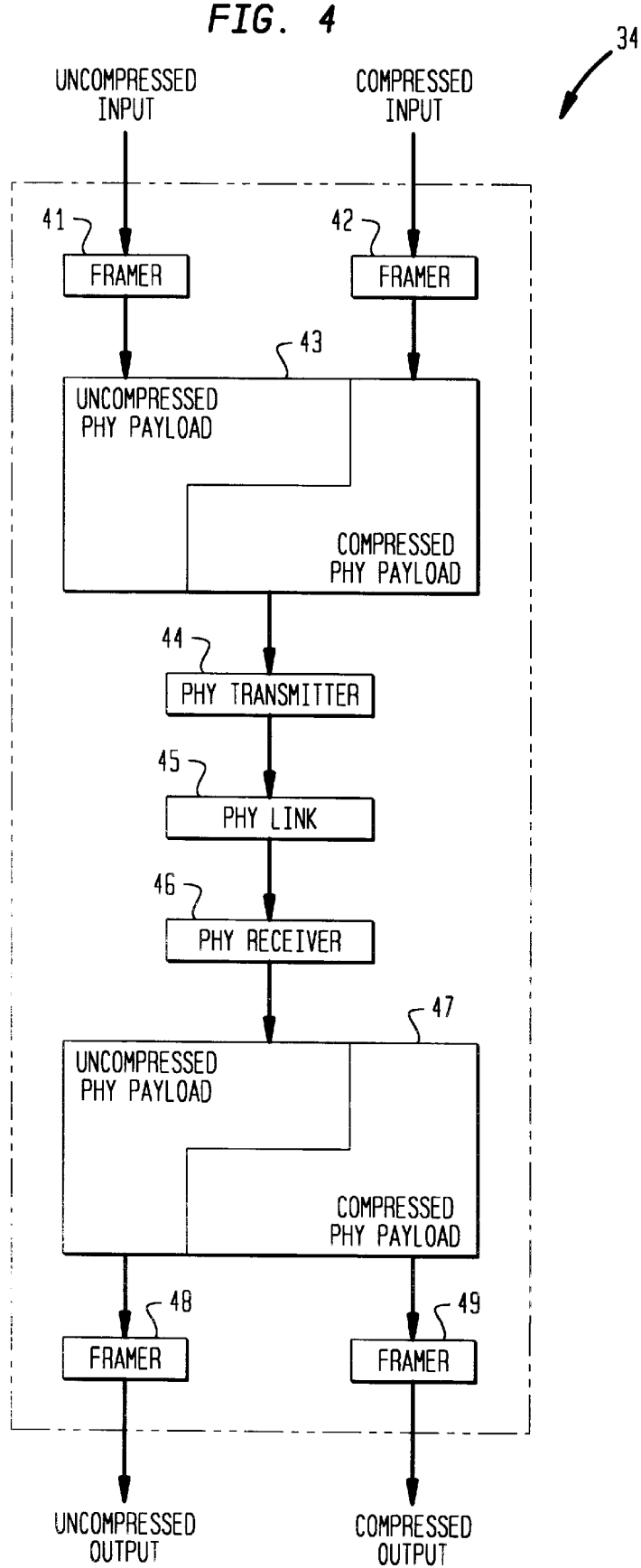
FIG. 4 is a block diagram of the new framer/physical link means shown in FIG. 3.

A more detailed view of one embodiment of framer/physical transport means 34 is shown in FIG. 4. As shown, framer/physical transport means 34 has framers 41 and 42 coupled to physical layer (PHY) payload registers 43 which are separated into a compressed PHY payload and an uncompressed PHY payload. PHY payload registers 43 are coupled to PHY transmitter 44 which, in turn, is coupled to physical link 45. Physical link 45 is coupled to PHY receiver 46 which, in turn, is coupled to PHY payload registers 47 which are separated into a compressed payload and an uncompressed payload. PHY payload registers 47 are, in turn, coupled to framers 48 and 49.

In operation, framer 41 maps the uncompressed parent cells into the uncompressed region of the PHY payload 43. Framer 42 removes the empty header bytes of each compressed baby cell and maps the compressed baby cells into the compressed region of the PHY payload 43. Each region of the payload (i.e. the compressed and uncompressed region) has a pointer to indicate the position of the start of the ATM cell or block of cells in the respective region of the PHY payload 43. Thus, one pointer is used to indicate the start of the first parent or uncompressed ATM cell of a particular call, and a second pointer is used to indicate the start of the data block containing compressed baby cells of the call. More pointers can be used, if necessary, for a particular PHY link. Once framed as described above, however, the cells are then transmitted by PHY transmitter 44 over PHY link 45 to PHY receiver 46 where payload 47 is passed to framers 48 and 49 for regaining the original uncompressed and compressed cells, respectively.

Figure 5:
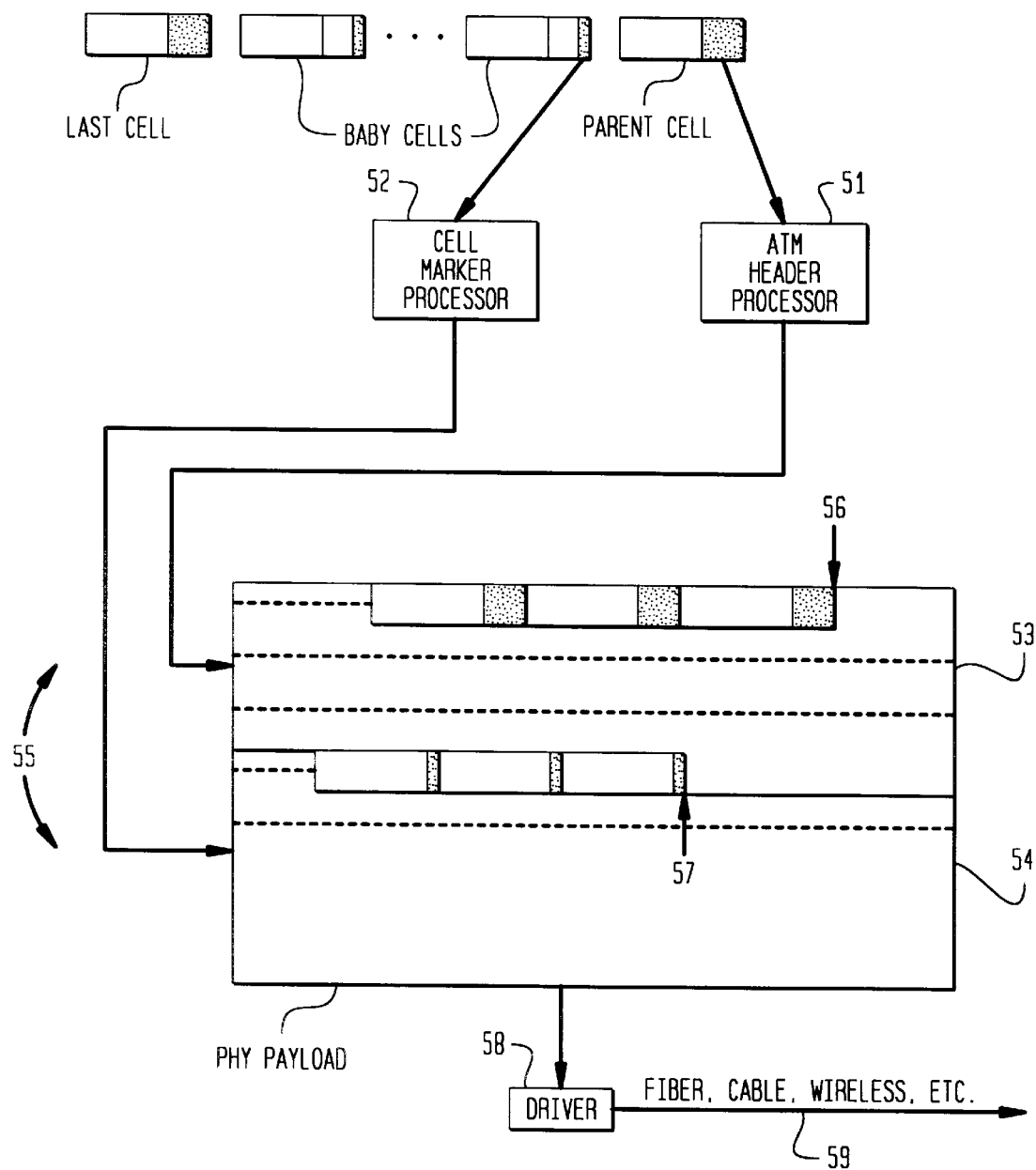
FIG. 5 is a pictorial view of a mapping method for separating parent cells and baby cells in two different regions of the PHY payload communicated over the network shown in FIG. 1.

An illustrative view of the operation of framers 41 and 42 on the ATM cells to form the payload 43 is shown in FIG. 5. As shown, the parent cells (i.e. the first and last cells of a call) are processed through ATM header processor 51 to region 53 of the PHY payload 55, and the baby cells of the call are processed through cell marker processor to region 54 of the PHY payload 55. Pointers 56 and 57 indicate the start of the first ATM cell in the PHY payload (pointer 56) and the start of the data block containing the compressed cells or baby cells (pointer 57), respectively. As shown payload 55 is driven by driver 58 over the PHY link 59.

Thus, in one embodiment of an ATM network 20 as shown through FIG.'s 2–6, compressor 21 is designed to dynamically establish a marker header (i.e. a compressed header) for each baby cell of a particular call. The marker header is used by each ATM switch of the enhanced ATM network 23 to determine which parent cell that each baby cell must follow to maintain a virtual circuit through the ATM network 20 for each particular call. In transmitting the ATM cells over the physical link, framers 41 and 42 essentially use pointers 56 and 57 to separate the call into a compressed payload containing the baby cells having the marker header, and an uncompressed payload containing the parent cells. Upon reaching the terminating ATM switch 35 and cell expander 22, the payloads are recombined and the baby cells are restored to their original headers.

Figure 6:
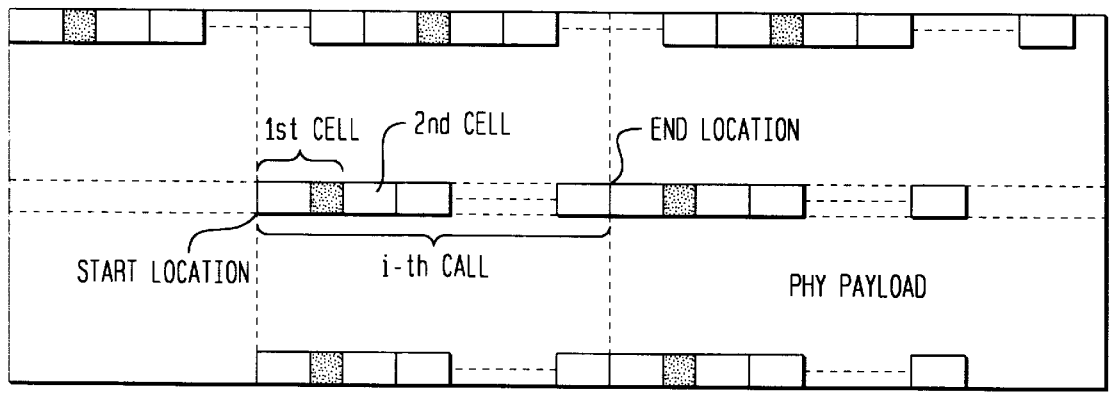
FIG. 6 is a pictorial view of a PHY payload mapping method to achieving further bandwidth reductions when the ATM network performs no additional switching between the initiating and the terminating ATM switch.

In another embodiment of an ATM network according to the present invention, the headers of the baby cells are completely eliminated and the remaining bytes of the ATM baby cells are mapped into blocks of the PHY payload specified by pointers. Such an embodiment, however, is limited to communications in an enhanced ATM network wherein there is no switching performed between the endpoints. That is, the headers of the baby cells can only be completely eliminated from the payload when there is only a call initiating ATM switch and a call terminating ATM switch used to provide communication between the endpoint of the call. The payload of such an embodiment is shown in FIG. 6. As shown, for the ith call, only the first cell (i.e. the parent cell) has a header wherein the second cell through last cell (i.e. the baby cells) have no header. Thus, further reducing bandwidth requirements of the network.

The bandwidth reductions achieved by the present invention can be described through the following illustrative embodiment. Assuming there are a total of N different calls, hence N different virtual circuits (VC's) and N different parent cells, then according to information theory, each baby cell needs to carry no more than $Log_2N$ bits for the ATM switch to identify to which parent cell the baby cell is associated. Therefore, according to the present invention, the existing 5 byte cell header can be reduced to $Log_2N$ bits. This represents a bandwidth reduction of $$\frac{40 - Log_2 N}{53 \times 8}.$$

As a result, a positive bandwidth reduction is achieved as along as the number of calls $N<2^{40}=1.1\times10^{12}$ calls.

Figure 7:
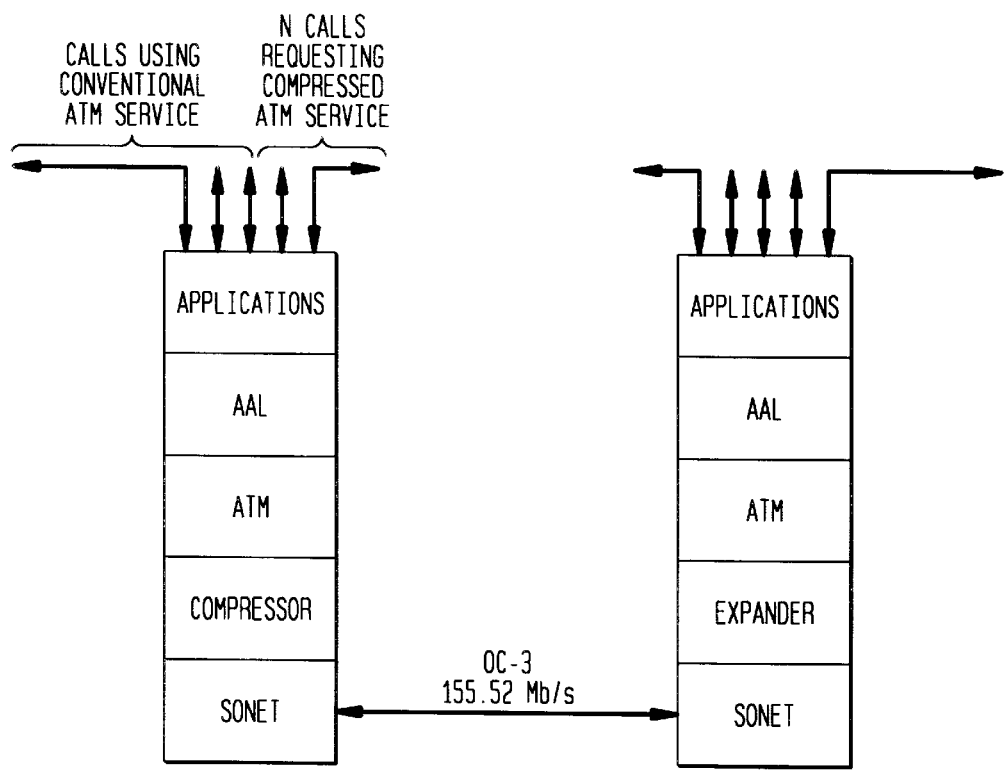
FIG. 7 is a block diagram of the communication layers an ATM network according to the present invention, wherein an OC-N (e.g. OC-3) SONET is used as a PHY link between an ATM switch originating a call and an ATM switch terminating the call.

In practice, however, N is limited by the PHY link capacity. For example, if a 155 Mb/s SONET link is used as the PHY link for end-to-end communications, then N is likely to be below 256 (assuming that each call uses about 1 Mb/s). As a result, only 8 bits are required for baby cell headers, thus enabling a total bandwidth reduction of approximately 7.5%. As described above, such cell compression can be carried out at both the ATM and PHY layers through framers and the separation of the PHY payload into two different regions. FIG. 7 shows the layers of communication between end-points.

At the ATM layer, compressed headers can be dynamically created to allow baby cells to be switched with their parent cells. The empty bytes enable the ATM buffers to hold more input cells, resulting in increased capacity and reduced congestion in the ATM network. Thus, less cells are dropped by the ATM switch during traffic congestion. At the PHY layer, cell compression is made easy by a synchronous ATM-PHY mapping function that can completely strip-off cell headers by placing all cells belonging to the same call in a block in the payload specified by pointers assigned for that call. This results in the transmission of less bytes for a particular call, thus further reducing the bandwidth.

The present invention is not limited to the illustrative embodiments discussed herein. Rather, the invention includes other variations thereof. For example, the inventive method of compressing the baby cell headers and the ATM-PHY mapping can be done through a single software module or a single hardware module added on to an existing ATM switch. Thus, maintaining prior investment in the ATM network and having no effect on the traffic of uncompressed cells through the network.

What is claimed is:

1. An ATM network for providing a virtual circuit for each end-to-end ATM call communicated over a physical link of the ATM network, each end-to-end call being carried by a sequence of ATM cells, wherein each cell has a header for providing switching information to the ATM network, the network comprising:

(A) a cell compressor for compressing the header of the ATM cells before being communicated over the physical link to remove redundant header information between consecutive ATM cells of a given ATM call;

(B) an enhanced ATM network for framing said ATM cells having compressed headers and the ATM cells having uncompressed headers in a physical link payload before being communicated over the physical link, said framing of said ATM cells having compressed headers for a given call being able to eliminate any header bytes from said ATM cells having compressed headers that provide information redundant to information in a header of a previous ATM cell of said call; and (C) an expander for expanding said compressed headers to their original form after being communicated over the physical link; said enhanced ATM network further comprising (a) an initiating ATM switch for switching compressed and uncompressed ATM cells from said cell compressor;

(b) a framer/physical link means for mapping said compressed ATM cells and the uncompressed ATM cells into the payload and for transmitting said payload over a physical link, said framer/physical link means further comprising (i) a transmitting framer for mapping said compressed and uncompressed ATM cells into separate regions of said payload;

(ii) a transmitter for transmitting said payload over a physical link, a receiver for receiving said payload transmitted on said physical link; and (iii) a receiving framer for restoring said header bytes being eliminated from said compressed headers and for sending said restored compressed ATM cells and said uncompressed ATM cells to said expander;

(c) a terminating ATM switch for switching said compressed and uncompressed ATM cells to said expander;

wherein said payload has a first pointer for indicating the beginning of the first cell of the sequence of cells in a given ATM call, and a second pointer for indicating the beginning of a block of compressed ATM cells in said given ATM call.

2. The ATM network of claim 1 wherein said physical link is selected from the group comprising a fiber link, a cable link, and a wireless link.

3. The ATM network of claim 1 wherein physical link is a SONET OC-N link.

4. The ATM network of claim 1 wherein said SONET link is an OC-3 link having a capacity of 155.52 Mb/sec.

5. A method for reducing communication bandwidth requirements of an enhanced ATM network that provides a virtual circuit for each end-to-end ATM call communicated over a physical link of the ATM network, each end-to-end call being carried by a sequence of ATM cells, wherein each cell has a header for providing switching information to the ATM network, the method comprising:

(A) compressing the header of consecutive ATM cells of a given ATM call to remove redundant header information between the consecutive ATM cells;

(B) communicating said ATM cells having compressed headers over the physical link;

(C) mapping said ATM cells having compressed headers and the ATM cells having uncompressed headers for said given call into a physical link payload before being communicated over the physical link, said mapping of said compressed ATM cells being able to eliminate header bytes from said ATM cells having compressed headers that provide information redundant to information in a header of a previous ATM cell of said given call; and (D) expanding said compressed headers communicated over the physical link back to their original form; said mapping step further comprising (a) switching compressed and uncompressed ATM cells through an initiating ATM switch to a framer/physical link means, said framer/physical link means mapping said compressed ATM cells and the uncompressed ATM cells into said payload, said framer/physical link means (i) mapping said compressed and uncompressed ATM cells into separate regions of said payload;
(ii) transmitting said payload over a physical link;
(iii) receiving said payload transmitted on said physical link; and
(iv) restoring said header bytes being eliminated from said compressed headers and for sending said compressed ATM cells and said uncompressed ATM cells to said expanding step;

(b) transmitting said payload over said physical link; and (c) switching said transmitted payload through a terminating ATM switch to communicated said compressed and uncompressed ATM cells to said expanding step;

wherein said payload has a first pointer for indicating the beginning of the first cell of the sequence of cells in a given ATM call, and a second pointer for indicating the beginning of a block of compressed ATM cells in said given ATM call.

6. The method of claim 5 wherein said physical link is selected from the group comprising a fiber link, a cable link, and a wireless link.

7. The method of claim 5 wherein physical link is a SONET OC-N link.

8. The method of claim 5 wherein said SONET link is an OC-3 link having a capacity of 155.52 Mb/sec.

* * * * *